United States Patent [19]

Clark et al.

[11] E Re. 31,042

[45] Reissued Sep. 28, 1982

[54] LASER CUTTING HEAD ATTACHMENT FOR PUNCH PRESSES

[75] Inventors: Stephen C. Clark, East Amherst; Victor T. Carbone, Cheektowaga, both of N.Y.

[73] Assignee: Houdaille Industries, Inc., Ft. Lauderdale, Fla.

[21] Appl. No.: 199,631

[22] Filed: Oct. 22, 1980

Related U.S. Patent Documents

Reissue of:

[64] Patent No.: 4,201,905
Issued: May 6, 1980
Appl. No.: 937,754
Filed: Aug. 29, 1978

[51] Int. Cl.[3] ..... B23K 26/00

[52] U.S. Cl. ..... 219/121 LG; 219/68; 219/121 L; 219/121 LU; 219/121 LY; 219/121 FS

[58] Field of Search ..... 219/68, 121 L, 121 LM, 219/121 LG, 121 LN, 121 LU, 121 LY, 121 FS, 121 LK; 83/410, 552

[56] References Cited

U.S. PATENT DOCUMENTS

| | | | |
|---|---|---|---|
| 499,519 | 6/1893 | Coffin | 219/68 |
| 3,612,814 | 10/1971 | Houldcroft | 219/121 L |
| 3,629,560 | 12/1971 | Slawson | 235/151.11 |
| 3,815,462 | 6/1974 | Kaufmann | 83/410 |
| 3,828,159 | 8/1974 | Zoot | 219/121 LM |
| 3,944,203 | 3/1976 | Brekelbaum | 219/68 |
| 4,031,351 | 6/1977 | Martin | 219/121 L |
| 4,063,059 | 12/1977 | Brolund et al. | 219/68 |
| 4,088,865 | 5/1978 | Peters et al. | 219/121 L |
| 4,096,774 | 6/1978 | Kaufmann | 83/552 |

OTHER PUBLICATIONS

Panelmaster CNC Model 848, Catalog 848-77, W. A. Whitney, pp. 1-8, copyright 1977.

*IEEE Journal of Quantum Electronics*, vol. QE-10, No. 2, pp. 179-185, Feb. 1974, "Metal Processing With a High-Power $CO_2$ Laser", by E. Locke, R. Hella.

Optics and Laser Technology, vol. 5, No. 6, Dec. 1973, pp. 256-265, "Printing of Part Numbers Using a High Power Laser Beam", by G. Holzinger, K. Kosanke, W. Menz.

*Jemma Mechanika a Optika*, vol. 20, No. 11, pp. 329-333, Nov. 1975, "A Laser Drilling Machine", by Vavrouch et al.

*The Fabricator*, Sep./Oct. 1976, pp. 1, 20, 22, 23, 30, "Lasers: Applications for Metal Processing", by Neil Forbes.

*American Machinist*, Jul. 1, 1975, pp. 41-56, "Lasers in Metalworking", by George Schaffer.

*Manufacturing Engineering & Management*, Dec. 1974, pp. 26-28, "Advent of the Job-Shop Laser", Edited by Bernard Feinberg.

*Optical Spectra*, Apr. 1975, "The Laser is a Processor", by Rivie Levin.

"Photon Sources: Innovators for Manufacturing Through Laser Technology", Sales Brochure Published by Photon Sources, Inc., Livonia, Michigan, Jan. 1978.

*Messr Griesheim GmbH*, Feb. 1974, "The Lasers Future in Metalwork", by Manfred Hoffman, Reprint from IPC Science & Technology Press Ltd., Guilford Surrey, Jan. 1974.

*Messr. Griesheim GmbH, Jun. 1975, "Economic Cutting With $CO_2$-Lasers"*, Reprint From Schweissen und Schneide, vol. 3/75, Pub. by DVS-Verlag Dusseldorf.

"Strippit," Sales Brochure published by Strippit, Houdaille, Akron, N.Y., 1972.

*Primary Examiner*—B. A. Reynolds
*Assistant Examiner*—M. Paschall
*Attorney, Agent, or Firm*—Hill, Van Santen, Steadman, Chiara & Simpson

[57] ABSTRACT

A turret punch machine tool equipped with controlled automatic x-y axis workpiece movement mechanisms for moving the workpiece over a stationary work table section adjacent a punching station is provided with a separate laser beam generator and with a tool frame carried vertically retractable and extendable laser cutting head in optical communication with the beam generator. The beam generator is capable of producing both laser pulses of varying duration and spacing or a continuous beam. The cutting head is provided with two gas inputs one for use with the continuous beam, a second for use with the pulse beam, and controls are provided to automatically provide varying combinations of use of the punch and laser.

11 Claims, 6 Drawing Figures

Fig. 3
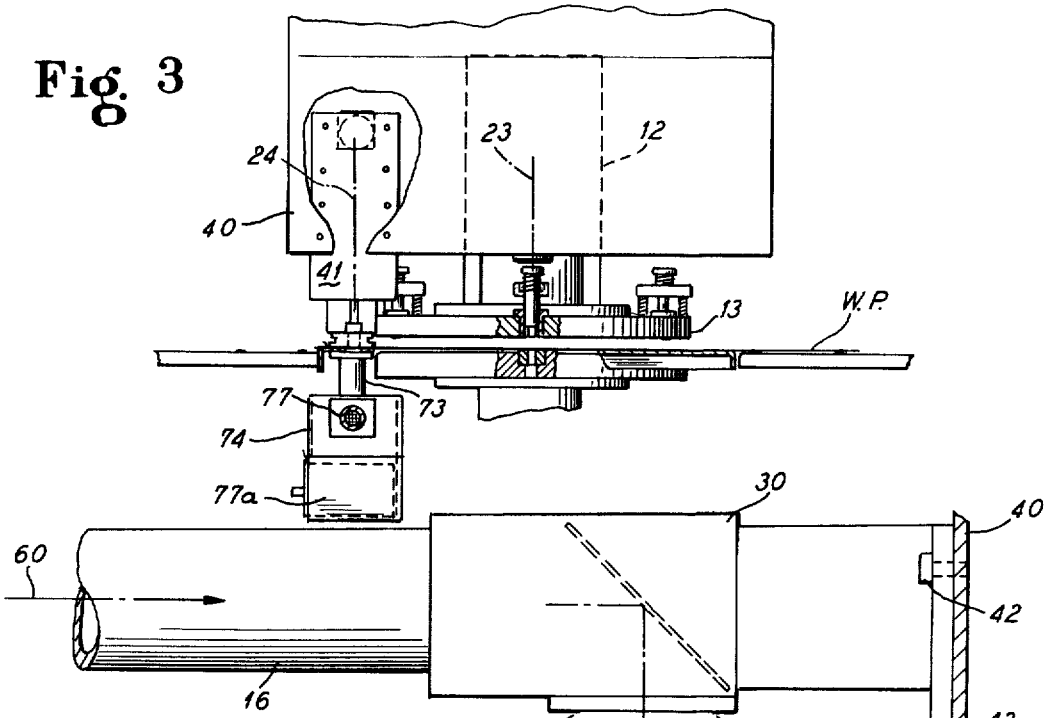
Fig. 4
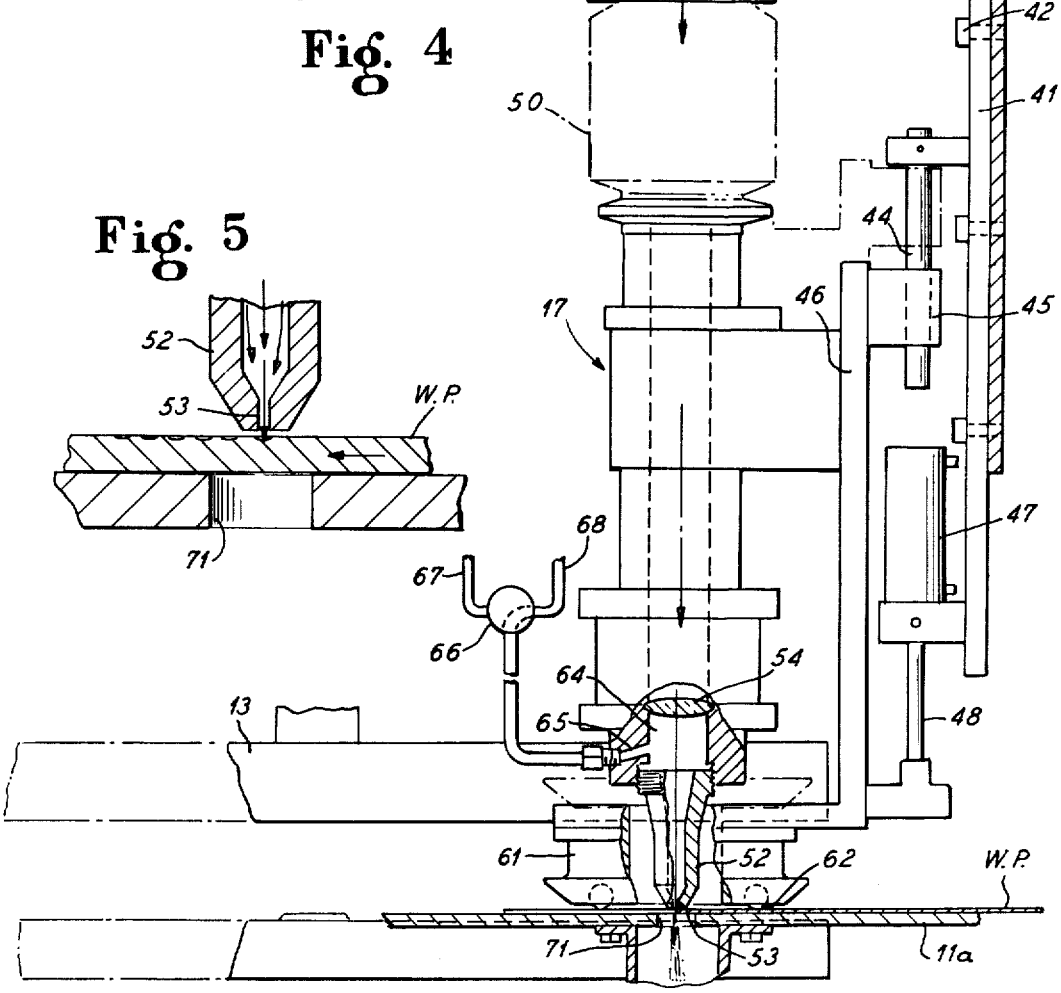
Fig. 5

LASER CUTTING HEAD ATTACHMENT FOR PUNCH PRESSES

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to machine tools and more particularly to a turret punch press equipped with a laser cutting and marking assembly.

2. Prior Art

Automatic computer controlled turret punch machine tools are known to the art wherein the machine tool is provided with computer controlled work piece movement gripping devices which move the workpiece accurately in both x and y axis directions with respect to a punching station. Movement of the workpiece is generally done, at least in part, over a stationry work table portion surrounding the lower turret of the machine tool. Controls and mechanisms for such workpiece movement have become so sophisticated that workpiece movement speeds in excess of 1500 inches per minute on either axis are known. Additionally, punch ram movements on the order of 400 strokes a minute are also known. Thus, modern computer controlled turret punches represent highly versatile machine tools capable of quickly and accurately providing sheet metal and plastics with desired punched out areas. However, the versatility of such turret punches is limited in that material can be removed from the workpiece only by a punching type operation. Thus, when large areas of the workpiece are to be removed, or when the workpiece is to be subdivided into a number of separable workpieces, or when relatively long or large diameter cuts are to be made, this can be accomplished only by a series of slightly overlapping punching type metal removal operations. This is generally referred to as "nibbling". Although such overlapping material removal operations can effectively be used to increase the versatility of a punch, those operations have, at times, undesired consequences, such as formation of burred edges, inability to produce highly accurate, smooth arcuate side edges, relative slowness of operation, etc. As a result, many cutting or shearing type operations are performed by other machine tools in a subsequent operation which requires additional workpiece handling.

In order to increase the ability of automatic punching equipment to provide large and/or irregularly shaped holes in the workpiece, it has been suggested to equip the punch press with a plasma arc cutting torch. See for example U.S. Pat. No. 4,063,059. Such cutting torches are frequently undesirable in that they have inherent disadvantages such as relatively large kirfs, ragged edges and large heat distort areas adjacent the cut.

Although it has been known to provide metal cutting machines utilizing techniques other than plasma arc torches, including laser beam cutting machines, such devices have not previously been integrated with machine tool turret punches.

Among other reasons for the art to have not attempted a combination of a laser cutting device and a machine tool turret punch is the fact that during punching operations, the entire machine tool is subjected to pounding vibrations. Since lasers are highly sensitive devices, it has hitherto been thought that they would not be adaptable for use in high shock and vibration locations.

It would, therefore, be an advance in the art to combine a laser cutting tool with a machine tool computer controlled turret punch.

Moreover, it is often times desirable to surface mark a workpiece at a precisely predetermined position. Punching machines are primarily designed for material removal and are not generally capable of surface marking. The same is true with respect to cutting lasers.

It would, therefore, be a further advance in the art to provide a combination turret punch and laser cutting assembly having capabilities of surface marking of workpieces.

Additionally, it would represent a major advance in the art of machine tools to provide a single machine tool capable of high speed, high accuracy workpiece punching, cutting, and surface marking wherein all functions are controllable from a central automatic control and wherein workpiece movement is accomplished by a single mechanism so as to eliminate the necessity of workpiece handling between operations.

SUMMARY OF THE INVENTION

It is a principal object of this invention to provide each of the above enumerated advances.

More specifically, it is an object of this invention to provide a combined automatic turret punching machine tool and automatic laser cutting tool wherein both the punching tool and the cutting tool share a common control and a common workpiece movement system.

It is an additional specific object of this invention to provide an automatically controlled turret punch machine tool equipped with laser cutting abilities wherein the laser is automatically controllable to provide workpiece surface marking in addition to workpiece cutting.

This invention utilizes, in parts, a prior art turret punch device which can be chosen from among those presently available representing the best state of the art.

High speed automatically controlled turret punch machine tools known to the art include a generally C-shaped main frame having upper and lower arms supporting rotatable turrets in closely spaced opposed relationship. The upper turret carries a plurality of punching tools whereas the lower turret carries a plurality of mating dies. A ram mechanism carried by the upper frame arm activates the punches. The machine tool is also provided with a work table and with moving grippers which engage peripheral edges of a workpiece and move the workpiece over the work table with respect to a punching station located at the ram. Frequently, portions of the work table move with the grippers, although it has been known to use grippers which move totally independently of the work table. In both cases, a central portion of the work table immediately surrounding the lower turret is generally stationary.

Such machine tools are substantially automated and are controlled from a central processor which may be a computer, a paper tape reader, a hard wire sequencer, or the like. Such control systems automatically sequence turret rotation to present the desired set of punch and die tools at the punching station, control workpiece gripper movement to present the desired location of the workpiece to the punching station, and control ram movement to activate the selected punch.

This invention provides an automatically controlled turret punch machine tool of the above type equipped with a laser cutting tool and a common automatically controlled workpiece movement apparatus. The laser cutting tool includes a laser beam generator, a laser beam pathway and a cutting head assembly. The laser beam generator is independent of the turret punch machine tool so as to be unaffected by the jarring vibratory operation thereof. This cutting head assembly is mounted to the upper arm of the punch frame overlying a portion of the stationary portion of the work table. The stationary portion of the work table is provided with an opening therethrough to a receptacle positioned under the work table. The receptacle is provided with a gas evacuation system and a debris filtering screen.

The principles of this invention are believed utilizable with many of the machine tool punches presently available on the market, and specifically in association with automatically controlled turret punch machine tools such as the model 1250 available from Strippit Division of Houdaille Industries, Inc., Akron, New York, or of the type shown in U.S. Pat. No. 4,096,774 issued June 27, 1978, the teaching of which are herein incorporated by reference. For reasons which appear more fully hereinafter, the preferred laser generator is a gas laser, particularly a $CO_2$ laser having both continuous output and pulsed output modes such as are generally available, for example, from Photon Sources of Livonia, Michigan as model 300. Laser's having outputs from between approximately 300 to 1000 watts capable of cutting sheet metal from 22 gauge to 0.5 inches or larger are preferred.

A gas supply system is provided to the cutting head allowing selective delivery from at least two different gas sources of gas to the cutting head. One of the gases should be chosen from those gases which cooperate with the laser cutting beam to form an exothermic reaction to measurably increase the cutting speed and ability of the laser. Another of the gases is preferably of the type which produces little or no exothermic reaction. It has been found that by using a reduced exothermic reaction gas, particularly in association with a pulsed laser, that it is possible to surface mark the workpiece rather than cutting through the workpiece. This feature provides added versatility to the overall machine tool in that the workpiece can now be provided with desired surfaced markings such as, for example, parts numbers, accurately positioned gauge marks for further machining operations, surface roughened areas and other indicia.

A common control system is provided for controlling activation of the laser, the cutting head, the gas supply systems, the receptacle exhaust system, the punch and associated turrets, and the workpiece movement control. Actual laser generation may be provided by a separate control system which is actuated from the central automatic control. It has been found that, due to the relatively quick actuating ability of modern laser beam generators, that the machine tool can be cycled back and forth between usage of the laser and usage of the punch with relativey little time delay. In order to avoid the possibility of any damage to the cutting head assembly during normal operation of the punch, the cutting head is vertically movable with respect to the work table so that when it is not in operation, it may be lifted to a free clearance position. When in the lowered, operating position, the cutting head assembly is equipped with roller means riding on the workpiece thereby assuring proper spacing of the focus lens of the cutting head from the workpiece.

It is therefore an object of this invention to provide a combined automatically controlled turret punch and laser cutting and marking machine tool utilizing a common automatically controlled workpiece movement system and workpiece support table in association with commonly controlled laser cutting head and turret punch.

Other objects, features and advantages of the invention will be readily apparent from the following description of preferred embodiments thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 3 is a fragmentary partially sectional view taken along the lines III—III FIG. 2.

FIG. 4 is a fragmentary partially sectional view of the laser cutting head of this invention.

FIG. 5 is an enlarged fragmentary sectional diagrammatic view of the working end of the laser cutting head illustrating a pulse mode operation.

DESCRIPTION OF THE PREFERRED EMBODIMENTS

Figure 1:
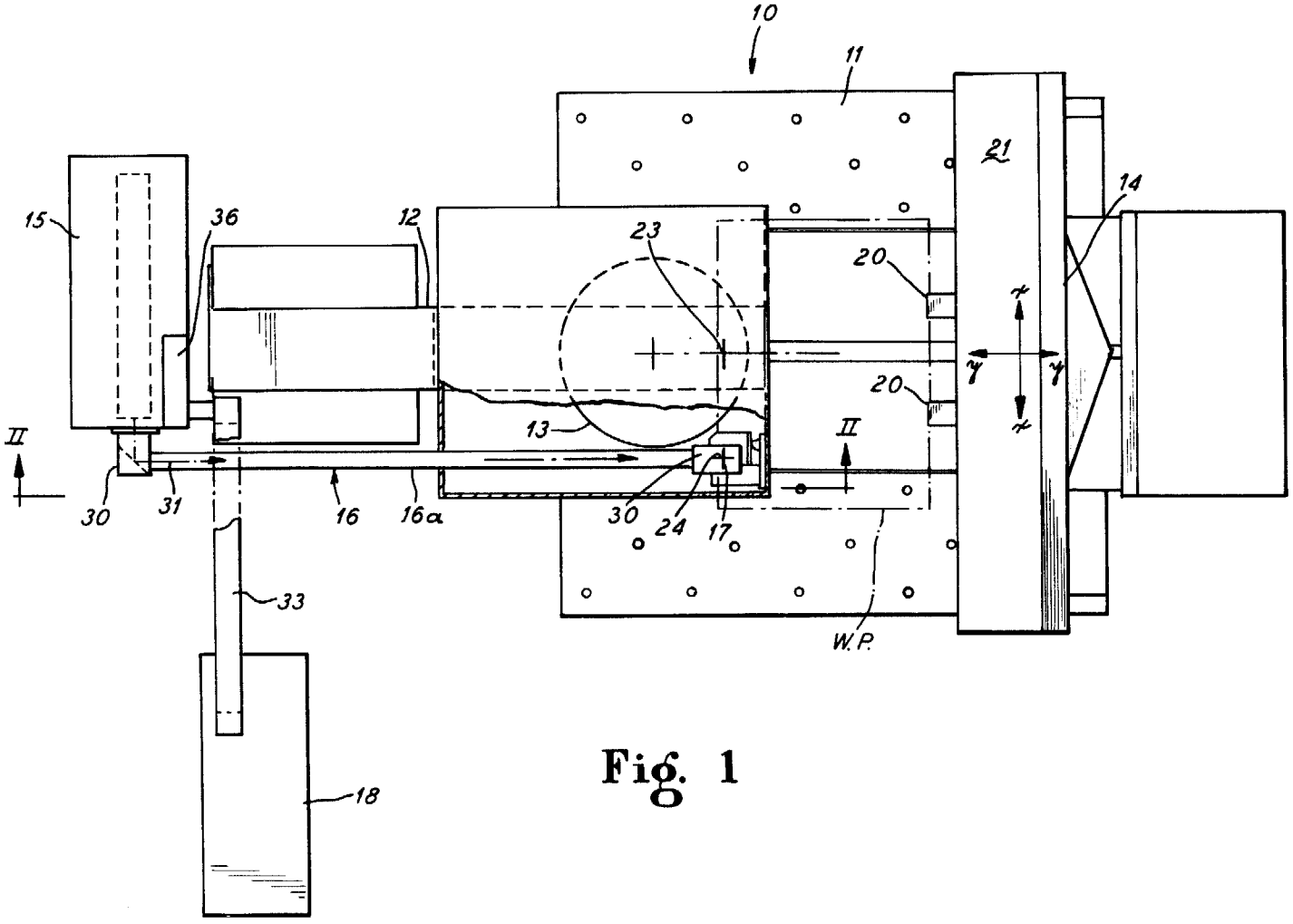
FIG. 1 is a top plan of the machine tool of this invention.

As illustrated in FIG. 1 the machine tool 10 of this invention includes a work table 11, a main frame 12 mounting turrets 13 of a turret punch, a workpiece movement assembly 14, a laser generator 15, a laser beam pathway 16, a laser cutting head assembly 17 and an automatic control 18.

The workpiece movement assembly 14 includes workpiece grippers 20 mounted on a carriage 21. The grippers 20 are movable in the x directions illustrated whereas the carriage 21 is movable in the y directions illustrated with respect to a punch work station 23 under the control of the control 18. The laser cutting head 17 is offset in one axis direction from the punch station 23 so that the cutting station 24 has one common axis position with respect to the work station 23. For example, it has been found efficient to mount the cutting station 24 on the y-axis 18 inches offset on the x-axis thereby simplifying workpiece movement control so that the y-axis movement control has a common reference point for both punch operation and laser operation. The control is provided with dual reference points in the x-axis direction so that the reference point for laser operation can be, for example, x-axis center point plus 18 inches. In this manner, as will be readily apparent to those skilled in the art, movement of the workpiece WP by the control 18 and workpiece movement assembly 14 when in the laser mode is greatly simplified.

By mounting the laser generator 15 remote from the main frame 12, it is assured that the jarring and vibration caused during operation of the punch will not adversely affect the highly sensitive laser generator. A laser beam pathway is provided through the use of beam benders 30 which, in the embodiment illustrated, with the laser generator mounted to the rear of the main frame 20, first bend the laser beam 31 in a direction parallel with the longitudinal axis of the main frame to a point immediately above the cutter head and then bend the beam at a right angle downwardly towards the work table 11. Such beam benders are commercially available and, for example, model 452 beam bender assembly available from Photon Sources, Livona, Michigan have been found adequate. The beam pathway can be enclosed by a ducting or conduit 16a. The control 18 is also located remote from the main frame 12 and control conduit 33 is provided coupling the control 18 to the control panel 35 of the machine tool and to the control panel 36 of the laser beam generator.

Figure 2:
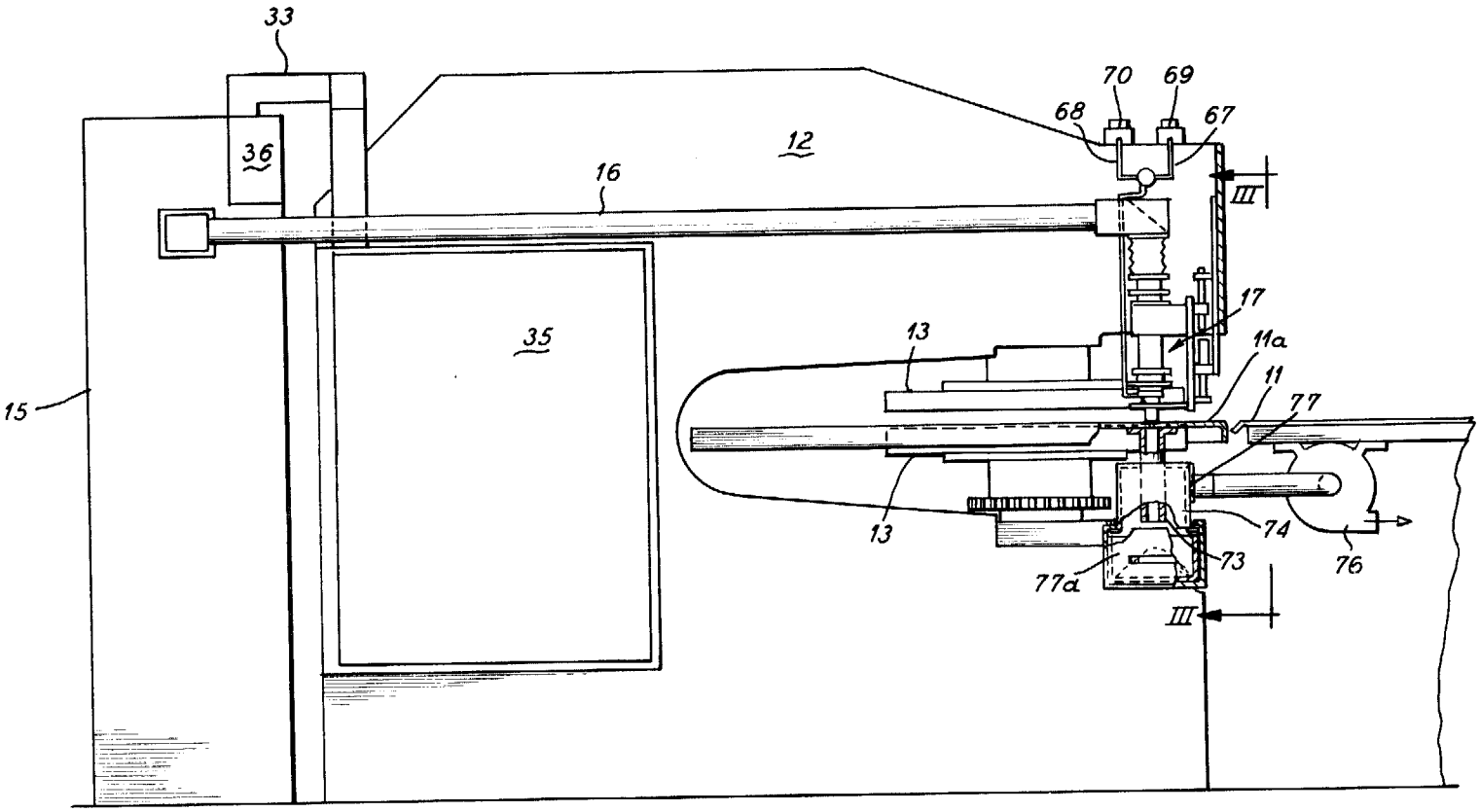
FIG. 2 is a side plan view, partially in section, of the machine tool of FIG. 1 taken along lines II—II.

As best shown in FIGS. 2, 3 and 4, the cutting head assembly 17 is mounted to a flange area 40 of the main frame 12 extending to the side in front of and above the turrets 13. The flange 40 is positioned above a stationary portion 11a of the work table 11. The cutting head assembly is mounted on a mounting plate 41 bolted to the flange as at 42. A pair of spaced apart guide rods 44 are received in bushings 45 affixed to a movable mount 46, the guide rods being firmly affixed to the plate 41. In this manner the mount 46 is vertically movable and a hydraulic cylinder 47 attached to plate 41 has a power arm 48 affixed to the member 46. In this manner the major portions of the cutting head assembly can be raised and lowered with respect to the workpiece WP. The cutting head assembly includes a flexible conduit or coupling member 50 allowing movement of portions of the cutting head assembly upwardly and downwardly with respect to the frame and stationary beam bender.

The cutting head assembly terminates in a tip 52 having a cutting end aperture 53 aligned with a focusing lens system 54 positioned below the flexible coupling 50. Beam bender 30 is positioned above the coupling 50 and may be affixed to and carried by the main frame. In this manner a laser beam moving through pathway conduit 16 in the direction illustrated by arrow 60 of FIG. 4 is bent by the beam bender 30, which may be a mirror, downwardly through the cutting head, which has a hollow interior, through the focusing lens 54 to the tip aperture 53. A shield 61 surrounds the tip and carries a plurality of anti-friction balls 62 at its under surface. The balls 62 ride on the workpiece WP maintaining the lens system 54 at a predetermined distance from the tip of the workpiece.

The cutting head assembly has a hollow conduit portion 64 intermediate the tip 52 and the lens 54. The hollow conduit portion 64 has gas entrance channel 65 to which gas lines 67 and 68 are coupled through a selector valve 66 and appropriate fittings. The gas lines 67 and 68 are in turn coupled with gas supply source valves 69 and 70 which in turn are in communication with pressured gas sources (not shown). The gas sources for lines 67 and 68 are different with one gas source providing, preferably, a good exothermic reaction during cutting. Such a gas source might, for example, be oxygen while the other gas source preferably provides a lesser or no exothermic reaction. In practice the second gas source might, for example, be air or, if desired, an inert gas.

Positioned immediately below the tip 52 is an aperture 71 in the stationary portion 11a of the work table 11. A flanged conduit tube 73 of larger internal diameter than the aperture 71 is affixed to the under surface of the work table 11a aligned with the aperture 71. The conduit 73 extends downwardly into a waste recepticle 74 having a hollow chamber extending upwardly for some distance along the length of the conduit 73, the chamber being larger than the conduit. A gas evacuation system such as a blower 76 is ported to the chamber surrounding the conduit 73 through a filter 77a which may, for example, be a metal screen. The chamber surrounding the conduit 73 is in turn in communication with a larger bottom chamber 77 below the end of tube 73, which may include a removable drawer, for deposit of debris generated during cutting operations.

As previously explained the center line 24 of the cutting head assembly is paralled to the punch station center line 23 and is spaced therefrom approximately 18 inches in the x-axis direction while being aligned in the y-axis direction. It has been found that this 18 inch spacing allows clearance of the cutter head assembly with respect to the periphery of the turrets while still maintaining the cutter head assembly overlying the stationary portion of the work table.

FIG. 4 illustrates operation of the system with the laser in a continuous mode wherein the workpiece WP is being cut through by the laser. FIG. 5 schematically illustrates operation of the laser in a pulse mode where the workpiece WP is being surface marked by the laser to a depth less than the thickness of the workpiece. It has been found that by proper control of the laser and the gas supply, the laser can be utilized for both workpiece cutting and workpiece surface scribing. Since the workpiece movement control is capable of simultaneous movement on both axes, substantially any shape marking or cut can be accomplished with the laser.

Figure 6:
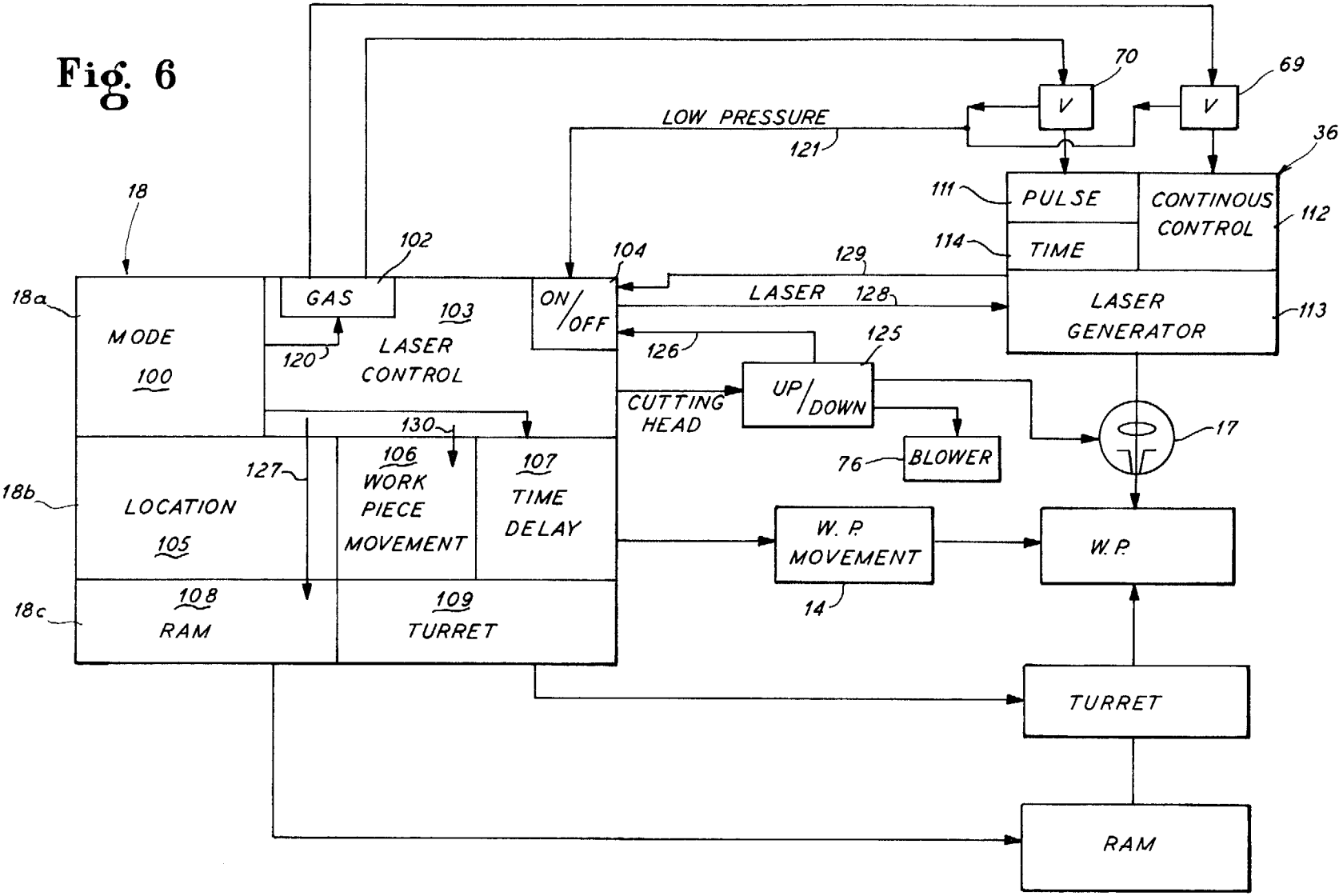
FIG. 6 is a block diagram view of controls for the machine tool of this invention.

FIG. 6 illustrates by a block diagram layout, a simplified view of the controls for the machine tool of this invention. The controls include the central NC controller 18, the laser associated controls 36 and various command and feedback sensors and valves. For purposes of illustration only, the central control 18, which may include a micro-processor or the like, can be pictured as having three sections; 18a for control of the laser, 18b for control of the workpiece movement apparatus and 18c for control of the punch including the ram and turrets. The section 18a includes a mode selector 100, a gas selector 102, an overall laser control 103 and a safety stop on/off section 104. The workpiece movement control includes a location section 105 which stores information relative to the present location of the workpiece movement apparatus and the like, a workpiece actuator 106 and may also include a time delay 107 which may also be a part of section 18a. The section 18c includes punch ram controls 108 and turret rotation controls 109. The laser includes a pulse mode section 111 and a continuous mode section 112 as well as a laser beam generator section 113. The pulse mode section includes time controls 114 for controlling both the timing between pulses and the duration of pulses.

The mode selector 103 is utilized to select between laser pulse operation or continuous operation. It may provide the necessary inputs by any desired means and, for example, in the diagrammatic view is shown as providing an input 120 to the gas selector 102 which in turn provides inputs either to gas control valve 70 or gas control valve 69 which in turn provide inputs either to the pulse mode or the continuous mode for setting the laser generator 113. The mode control may activate the time delay 107. The time delay 107 is activated only when the laser is in the cut or continuous mode and functions to delay actuation of the workpiece movement assembly 14 by a preselected amount. This is to enable the laser to cut through the workpiece prior to initiation of movement of the workpiece. It has been found that the laser takes a longer quantum of time to make an initial through-cut than it does to cut an equal amount of material after the initial through-cut has been made. When the mode has been selected and either valve 70 or valve 69 have been opened supplying gas to the cutting head 17, and either activating or not activating the time delay 107, the laser control 103 is activated. Laser control 103 activates the laser generator 113 through safety on/off 104. Safety on/off 104 receives information feedback from the gas lines as at 121 creating an all stop condition if a low pressure is sensed. The laser control 103, also operates the cutting head position. That provides a feedback, as at 126 to the safety on/off 104 such that the laser generator 113 cannot be activated in the cutting head up position. The cutting head thus must be lowered before activation of the laser, the blower 76 may be activated as a result of lowering of the cutting head or may be controlled by the gas system. Laser activation also, as indicated at 127 inhibits actuation of the ram. If desired an inhibitor signal can also be provided to the turret control 109, however, since the laser does not in any way interfere with the turret, turret selection for rotation of the next tool set to the punching station can be accomplished simultaneously with the use of the laser unless it is desired to inhibit actuation of the turret during movement of the workpiece. When a command signal sent to the laser by line 128 fails to actuate the laser generator 113, as, for example, during a low power situation, that failure is inputed by line 129 to the on/off safety 104 to produce an "all stop" condition.

It will be appreciated by those skilled in the art from the above that modifications to the control system of existing NC turret machine tools in order to provide for addition of laser cutting abilities according to this invention is relatively simple. It will further be appreciated that the time delay block 107 is not needed when the laser is being used for surface marking and the pulse mode is selected.

The time delay 107 is necessary for proper utilization of the cutting mode of the laser, however, the quantum of the time delay differs for differing materials and workpiece thicknesses. Therefore, in a further modification of the system, the time delay 107 can be provided as a separate programmable clock function within the controller 18. In that instance, the time delay function may either delay activation of workpiece movement after initiation of the laser or, may be used as a separate laser beam terminator which, when programmed by an additional command provides automatic laser shut off after expiration of the programmed time period.

By integrating the time delay with the laser activation, as opposed to the workpiece movement mechanism, an additional function is provided. Frequently workpieces must be bored with very small diameter openings. Although extremely small diameter punches are available, they are expensive and, in some environments have high failure rates. Because of the very small diameter of the laser beam, it can also be used to provide through-cuts of small dimension.

As further shown in FIG. 6, activation of the laser by the laser control 103 also inputs a signal 130 to the workpiece control indicating that the cutting head has been lowered. The signal 130 may, if desired, be input directly from a micro-switch or other sensing device associated with the cutting head. The function of the signal 130 is to initiate a safety within the workpiece movement control preventing movement of the workpiece grippers 20 into the area underlying the cutting head so as to prevent damage to the grippers. This feature can alternatively be supplied by a sensing means associated with the grippers cabable of contacting the lowered cutting head upon movement of the grippers to a position adjacent the cutting head. A signal from such a sensor can then be fed back to the control either creating an all stop condition or activating an over-riding program to terminate operation of the laser, reposition the grippers, reactivate the laser and continue workpiece movement.

It is to be understood that the proper design of the cutter head will result in a very small clearance relationship between the bottom of the cutter head shield and the top of the workpiece such that the safety system for the grippers should be activated before the grippers have reached a position of possible contact with the cutter head.

FIG. 5 illustrates use of the laser in the pulse mode. It has been found that by choosing the proper pulse duration and pulse separation time, a continuous scroll line can be formed on the surface of most workpieces. However, by lengthening the time between pulses, a spaced dash marking can also be accomplished.

Actual command control for use of the laser is relatively simple and a typical program may include the following commands:

G63-Prepare to Mark
Selects assist gas for marking and places mode of laser in "Pulse".

G64-Prepare to Cut
Selects assist gas for cutting and places mode of laser in "Continuous".

Gϕϕ-Cancels G63 or G64 and places control back in "point-to-point" positioning mode.

M63-Assist Gas On
Applies gas selected via G63 or G64 to nozzle of cutting head.

M64-Assist Gas Off.

M65-Head Down
Causes cutting head to lower to surface of work sheet.

M66-Head Up
Raises cutting head to stored up position.

M67-Beam Off
May be used to command beam off. However, the beam is automatically turned off when axes are "IN POSITION" or when a programmed time delay is completed.

M68-Beam On
Turns laser beam on. Command is non-modal and must be repeated each time beam on is required.

It will be appreciated that the G commands are preparation commands whereas the M commands are execution commands.

A typical command sequence for operation of the machine tool to provide both a linear cut, then a workpiece movement and punch operation, then a scribed circle and, finally, a further punch operation might be as follows:

| Block | Commands |
|---|---|
| 001 | G64 M63 M65 |
| 002 | Gϕ4 Xϕ2 M68 |
| 003 | Gϕ1 Xϕ5 Yϕ5 M68 F008 |

-continued

| Block | Commands |
|---|---|
| 004 | M64 M66 |
| 005 | Gϕϕ X1ϕ Y1ϕ G68 |
| 006 | G63 M63 M65 |
| 007 | Gϕ2 Xϕ3 Yϕ3 Iϕ3 Fϕ1ϕ M68 |
| 008 | Xϕ3 Y-ϕ3 Jϕ3 M68 |
| 009 | X-ϕ3 Y-ϕ3 Iϕ3 M68 |
| 010 | X-ϕ3 Yϕ3 Jϕ3 M68 |
| 011 | M64 M66 |
| 012 | Gϕϕ Xϕ1 Yϕ1 G68 |

In considering the above sequence it is to be assumed that at the end of each block there is a block end signal instructing the processor to read the next block. The above sequence will provide the following control of the machine tool.

| | |
|---|---|
| Block 001 | G64 M63 M65 |
| (1) | Laser mode is selected for "continuous" cutting and oxygen is selected as assist gas |
| (2) | Gas is applied to cutting head tip |
| (3) | Cutting head is lowered to workpiece |
| Block 002 | G04 X02 M68 |
| (1) | Laser beam is turned on and allowed to penetrate sheet metal. After a delay of (2) (25) = 50 milliseconds, the laser beam is automatically turned off |
| Block 003 | G01 X95 Y95 M68 F008 |
| (1) | Laser beam is turned on and workpiece is moved at 80 IPM (F008) at a 45° angle in the x plus and y plus direction |
| (2) | Upon completion of the move, the laser beam is automatically turned off |
| Block 004 | M64 M66 |
| (1) | The assist gas is turned off |
| (2) | The cutting head is raised |
| Block 005 | G00 X10 Y10 G68 |
| (1) | The control is placed back in a point-to-point mode |
| (2) | A 10 inch move in x and y takes place |
| (3) | After completion of this move, a "punch" operation (G68) takes place |
| Block 006 | G63 M63 M65 |
| (1) | Laser mode is selected for "Pulse" and air is selected as assist gas in preparation for marking |
| (2) | Gas is turned on and applied to tip |
| (3) | Cutting head is lowered |
| Block 007 | G02 X03 Y03 I03 F010 M68 |
| (1) | Laser beam is turned on and workpiece moves in circular arc at a rate of 100 IPM along the path |
| (2) | After completion of this arc, laser beam is turned off |
| Block 008<br>Block 009<br>Block 010 | Circle is completed with update of tape information occurring at the end of each quarter circle |
| Block 011 | M64 M66 |
| (1) | Asisst gas is turned off |
| (2) | Cutting head is raised |
| Block 011 | G00 X01 Y01 G68 |
| (1) | The control is placed back in point-to-point mode and motion is x and y is followed by "punch" operation |

Although not shown on the drawings, it will be apparent to those skilled in the art that the various systems herein include necessary equipment such as pressure sensors in the gas supply systems, position sensors, such as micro-switches in the cutting head assembly, and the like.

It further should be appreciated that the laser cutting head is substantially shock isolated from the punch frame although mounted on and carried by the punch frame. To this end, the air cylinder 47 operates in the manner of a hydraulic cushion. Additionally the bars 44 may be provided with both top and bottom springs engaging the bushings 45. The springs cooperate with the air cylinder support to shock isolate the cutting head. This is desirable in view of the fact that the focusing lens system 54 is provided in the cutting head and, therefore, is carried by the machine tool rather than being provided in the isolated beam generator.

It will therefore be seen from the above that our invention provides a machine tool having automatically controlled punching, cutting and surface marking capabilities utilizing either a turret punch assembly or a laser cutting assembly each of which share a common workpiece movement control.

Although the teachings of my invention have herein been discussed with reference to specific theories and embodiments, it is to be undertood that these are by way of illustration only and that others may wish to utilize my invention in different designs or applications.

We claim as our invention:

1. In a machine tool punch press having a main frame, main frame carried upper and lower spaced rotatable turrets respectively carrying punch tools and die tools, a main frame carried vertically reciprocatable punch ram stationed at a work station, a worktable extending outwardly from adjacent the lower turret at least to the sides and front thereof having at least a stationary portion adjacent the lower turret, the stationary portion aligned with the work station and spaced to a side thereof, a central automatic control controlling the turrets and punch ram and further controlling workpiece movement apparatus effective to move a workpiece with respect to at least the stationary portion of the worktable and the work station, the improvement of:

(a) a vertically movable laser cutting head carried by the main frame above the stationary portion of the worktable, the cutting head including a hollow tip assembly adjacent the bottom thereof and a beam focusing optical means adjustably fixably spaced from a bottom of the tip assembly and vertically movable with the cutting head, (b) a laser beam generator, the laser beam generator being spaced from the machine tool punch press and main frame and being substantially isolated therefrom whereby vibration of the machine tool punch press is isolated from the beam generator, (c) an optical beam pathway interconnecting the cutting head and the laser beam generator, the pathway including beam bending optics directing a laser beam through the tip, an opening through the stationary portion of the worktable aligned with the laser beam eminating from the hollow tip, (d) a control means automatically alternatively controlling punching operation and laser operation from said central automatic control, said control means including means for vertically moving the cutting head in dependent relationship to selection of laser operation, said control means being a portion of said central control.

2. A device according to claim 1 including at least one gas supply system actuatable to deliver gas under pressure to the interior of the hollow tip, said gas supply system including a supply of exothermic reaction producing gas, said control means including means for activating the gas system in dependent relation to selection of laser operation.

3. A device according to claim 2 including at least two gas supply systems independently actuatable to deliver gas under pressure to the tip interior, a first of the systems supplying an exothermic reaction producing gas and a second of the systems supplying a gas of a lesser exothermic reaction capability than the gas of the first of the systems, the laser beam generator having selectable, continuous and pulsed operation modes, the control means including means for selecting one of said modes and means for selecting actuation of one or another of said gas supply systems.

4. A device according to claim 3 wherein the control means includes means for lowering said cutting head to an operating position from an elevated storage position in dependent response to selection of laser operation.

5. In a machine tool punch press having a main frame, main frame carried upper and lower spaced rotatable turrets respectively carrying punch tools and die tools, a main frame carried vertically reciprocatable punch ram stationed at a work station, a worktable extending outwardly from adjacent the lower turret at least to the sides and front thereof having at least a stationary portion adjacent the lower turret, the stationary portion aligned with the work station and spaced to a side thereof, a central automatic control controlling the turrets and punch ram and further controlling workpiece movement apparatus effective to move a workpiece with respect to at least the stationary portion of the worktable and the work station, the improvement of:

(a) a vertically movable laser cutting head carried by the main frame above the stationary portion of the worktable, the cutting head including a hollow tip assembly adjacent a bottom thereof and a beam focusing optical means vertically movable with the cutting head, (b) at least two gas supply systems independently actuatable to deliver gas under pressure to the tip interior, a first of the systems supplying an exothermic reaction producing gas, (c) a laser beam generator, the laser beam generator being spaced from the machine tool punch press and main frame and being substantially isolated therefrom whereby vibration of the machine tool punch press is isolated from the beam generator, (d) an optical beam pathway interconnecting the cutting head and laser beam generator, (e) control means automatically alternatively controlling punching operation and laser operation from said central automatic control, said control means including means for activating a selected one of the gas systems.

6. In a machine tool punch press having a main frame, main frame carried upper and lower spaced rotatable turrets respectively carrying punch tools and die tools, a main frame carried vertically reciproctable punch ram stationed at a work station, a worktable extending outwardly from adjacent the lower turret at least to the sides and front thereof having at least a stationary portion adjacent the lower turret, the stationary portion aligned with the work station and spaced to a side thereof, a central automatic control controlling the turrets and punch ram and further controlling workpiece movement apparatus effective to move a workpiece with respect to at least the stationary portion of the worktable and the work station, the improvement of:

(a) a vertically movable laser cutting head carried by the main frame above the stationary portion of the worktable, the cutting head including a hollow tip assembly adjacent a bottom thereof and a beam focusing optical means vertically movable with the cutting head, (b) at least two gas supply systems independently actuatable to deliver gas under pressure to the tip interior, first of the systems supplying an exothermic reaction producing gas, (c) a laser beam generator, the laser beam generator being spaced from the machine tool punch press and main frame and being substantially isolated therefrom whereby vibration of the machine tool punch press is isolated from the beam generator, (d) an optical beam pathway interconnecting the cutting head and laser beam generator, (e) control means automatically alternatively controlling punching operation and laser operation from said central automatic control, said control means including means for activating a selected one of the gas systems in dependent relationship to selection of the one of the operating modes of the laser.

*7. In a machine tool punch press having a frame, frame carried upper and lower spaced rotatable turrets respectively carrying punch tools and die tools, a frame carried vertically reciprocatable punch ram stationed at a work station, a worktable extending outwardly from adjacent the lower turret at least to the sides and front thereof having at least a stationary portion adjacent the lower turret, the stationary portion aligned with the work station and spaced to a side thereof, a central automatic control controlling the turrets and punch ram and further controlling workpiece movement apparatus effective to move a workpiece with respect to at least the stationary portion of the worktable at the work station, the improvement of:*

*(a) a vertically movable laser cutting head carried in fixed relation to said frame above the stationary portion of the worktable, the cutting head including a hollow tip assembly adjacent the bottom thereof and a beam focusing optical means adjustably fixably spaced from a bottom of the tip assembly and vertically movable with the cutting head,*

*(b) a laser beam generator, the laser beam generator being spaced from the machine tool punch press and frame and being substantially isolated therefrom whereby vibration of the machine tool punch press is isolated from the beam generator,*

*(c) an optical beam pathway interconnecting the cutting head and the laser beam generator, the pathway including beam bending optics directing a laser beam through the tip, an opening through the stationary portion of the worktable aligned with the laser beam emanating from the hollow tip,*

*(d) a control means automatically alternatively controlling punching operation and laser operation from said central automatic control, said control means including means for vertically moving the cutting head in dependent relationship to selection of laser operation, said control means being a portion of said central control.*

*8. In a machine tool punch press having a main frame, main frame carried upper and lower spaced tool holders respectively carrying punch tools and die tools, a main frame carried vertically reciprocatable punch ram stationed at a work station, a worktable extending outwardly from adjacent the lower tool holder at least to the sides and front thereof having at least a stationary portion adjacent the lower tool holder, the stationary portion aligned with the work station and spaced to a side thereof, a central automatic control controlling the tool holders and punch ram and further controlling workpiece movement appara-*

*tus effective to move a workpiece with respect to at least the stationary portion of the worktable and the work station, the improvement of:*

*(a) a vertically movable laser cutting head carried by the main frame above the stationary portion of the worktable, the cutting head including a hollow tip assembly adjacent the bottom thereof and a beam focusing optical means adjustably fixably spaced from a bottom of the tip assembly and vertically movable with the cutting head,*

*(b) a laser beam generator, the laser beam generator being spaced from the machine tool punch press and main frame and being substantially isolated therefrom whereby vibration of the machine tool punch press is isolated from the beam generator,*

*(c) an optical beam pathway interconnecting the cutting head and the laser beam generator, the pathway including beam bending optics directing a laser beam through the tip, an opening through the stationary portion of the worktable aligned with the laser beam emanating from the hollow tip,*

*(d) a control means automatically alternatively controlling punching operation and laser operation from said central automatic control, said control means including means for vertically moving the cutting head in dependent relationship to selection of laser operation, said control means being a portion of said central control.*

*9. In a machine tool punch press having a frame means, said frame means carrying upper and lower spaced tool holders respectively carrying punch tools and die tools, said frame means carrying a vertically reciprocatable punch ram stationed at a work station, a worktable extending outwardly from adjacent the lower tool holder at least to the sides and front thereof having at least a stationary portion adjacent the lower tool holder, the stationary portion aligned with the work station and spaced to a side thereof, a central automatic control controlling the tool holders and punch ram and further controlling workpiece movement apparatus effective to move a workpiece with respect to at least the stationary portion of worktable and the work station, the improvement of:*

*(a) a vertically movable laser cutting head carried in fixed relationship to said frame means above the stationary portion of the worktable, the cutting head including a hollow tip assembly adjacent the bottom thereof and a beam focusing optical means adjustably fixably spaced from a bottom of the tip assembly and vertically movable with the cutting head,*

*(b) a laser beam generator, the laser beam generator being spaced from the machine tool punch press and frame means and being substantially isolated therefrom whereby vibration of the machine tool punch press is isolated from the beam generator,*

*(c) an optical beam pathway interconnecting the cutting head and the laser beam generator, the pathway including beam bending optics directing a laser beam through the tip, an opening through the stationary portion of the worktable aligned with the laser beam emanating from the hollow tip,*

*(d) a control means automatically alternatively controlling punching operation and laser operation from said central automatic control, said control means including means for vertically moving the cutting head in dependent relationship to selection of laser operation, said control means being a portion of said central control.*

*10. In a machine tool punch press having a frame means, said frame means carrying upper and lower spaced tool holding means respectively carrying punch tools and die tools, said frame means carrying a vertically reciprocatable punch ram stationed at a work station, a worktable extending outwardly from adjacent the lower tool holding means at least to the sides and front thereof having at least a stationary portion adjacent the lower tool holding means, the stationary portion aligned with the work station and spaced to a side thereof, a central automatic control controlling the tool holding means and punch ram and further controlling workpiece movement apparatus effective to move a workpiece with respect to at least the stationary portion of the worktable and the work station, the improvement of:*

*(a) a vertically movable laser cutting head carried in fixed relationship to said frame means above the stationary portion of the worktable, the cutting head including a hollow tip assembly adjacent a bottom thereof and a beam focusing optical means vertically movable with the cutting head,*

*(b) at least two gas supply systems independently actuatable to deliver gas under pressure to the tip interior, a first of the systems supplying an exothermic reaction producing gas,*

*(c) a laser beam generator, the laser beam generator being spaced from the machine tool punch press and main frame and being substantially isolated therefrom whereby vibration of the machine tool punch press is isolated from the beam generator,*

*(d) an optical beam pathway interconnecting the cutting head and laser beam generator,*

*(e) control means automatically alternatively controlling punching operation and laser operation from said central automatic control, said control means including means for activating a selected one of the gas systems.*

*11. In a machine tool punch press having a main frame, main frame carried upper and lower spaced tool holders respectively carrying punch tools and die tools, a main frame carried vertically reciprocable punch ram stationed at a work station, a worktable extending outwardly from adjacent the lower tool holder at least to the sides and front thereof having at least a stationary portion adjacent the lower tool holder, the stationary portion aligned with the work station and spaced to a side thereof, a central automatic control controlling workpiece movement apparatus effective to move a workpiece with respect to at least the stationary portion of the worktable and the work station, the improvement of:*

*(a) a vertically movable laser cutting head carried by the main frame above the stationary portion of the worktable, the cutting head including a hollow tip assembly adjacent a bottom thereof and a beam focusing optical means vertically movable with the cutting head,*

*(b) at least two gas supply systems independently actuatable to deliver gas under pressure to the tip interior, first of the systems supplying an exothermic reaction producing gas,*

*(c) a laser beam generator, the laser beam generator being spaced from the machine tool punch press and main frame and being substantially isolated therefrom whereby vibration of the machine tool punch press is isolated from the beam generator,*

*(d) an optical beam pathway interconnecting the cutting head and laser beam generator,*

*(e) control means automatically alternatively controlling punching operation and laser operation from said central automatic control, said control means including means for activating a selected one of the gas systems in dependent relationship to selection of the one of the operating modes of the laser.*

* * * * *